United States Patent
Brochier

(10) Patent No.: US 11,014,505 B2
(45) Date of Patent: May 25, 2021

(54) ATTACHMENT DEVICE, SUPPORTING ACCESSORY AND ROOF TENT INCLUDING SUCH A DEVICE

(71) Applicant: Patrice Brochier, Saint Etienne de l'Olm (FR)

(72) Inventor: Patrice Brochier, Saint Etienne de l'Olm (FR)

( * ) Notice: Subject to any disclaimer, the term of this patent is extended or adjusted under 35 U.S.C. 154(b) by 43 days.

(21) Appl. No.: 16/466,816

(22) PCT Filed: Dec. 8, 2017

(86) PCT No.: PCT/FR2017/053475
§ 371 (c)(1),
(2) Date: Jun. 5, 2019

(87) PCT Pub. No.: WO2018/104684
PCT Pub. Date: Jun. 14, 2018

(65) Prior Publication Data
US 2019/0291653 A1    Sep. 26, 2019

(30) Foreign Application Priority Data
Dec. 9, 2016    (FR) .................................... 1662235

(51) Int. Cl.
*B60R 9/048*        (2006.01)
*B60R 9/045*        (2006.01)
(Continued)

(52) U.S. Cl.
CPC ............. *B60R 9/048* (2013.01); *B60R 9/045* (2013.01); *B60R 9/058* (2013.01); *F16B 2/12* (2013.01)

(58) Field of Classification Search
CPC .......... B60R 9/048; B60R 9/045; B60R 9/058
(Continued)

(56) References Cited

U.S. PATENT DOCUMENTS 4,058,133 A * 11/1977 Barr ........................ B60P 3/38
                                                                 135/88.17
4,101,061 A *  7/1978 Sage ....................... B60R 9/055
                                                                 224/322
(Continued)

FOREIGN PATENT DOCUMENTS

EP            0894672 B1    7/1998
EP            2 308 721 A2   4/2011
(Continued)

OTHER PUBLICATIONS

ISR; European Patent Office; NL; Feb. 19, 2018.

*Primary Examiner* — Nathan J Newhouse
*Assistant Examiner* — Lester L Vanterpool
(74) *Attorney, Agent, or Firm* — PatShegen IP LLC; Moshe Pinchas

(57) ABSTRACT

The present invention relates to a device (10) for attaching to bars (20) including:
  a C-shaped rail (105) with an overall rectangular section having a plane of symmetry (110);
  a screw (115) defining a first axis (120) parallel to the axis of the rail; and
  at least two jaws (125a, 125b), each jaw including:
    a guiding body (130a, 130b) running in the rail with a certain play and including a through-opening (135a, 135b) and
    a clamp (140a, 140b) outside the rail.
In this device:
  the head of the screw (145) is inserted into the opening (135a) of one jaw (125a);
  another jaw (125b) includes a nut (150) in the opening thereof (135b), rotatably locked;
  the clamps are off-center relative to the axis, each on one side of the plane, clamping the bar by shearing;
(Continued)

the screwing of the screw translates the jaws towards one another in the rail, and the engagement of the clamps of the jaws with the bar rotates the jaw, thus causing same to stick by self-locking.

11 Claims, 5 Drawing Sheets

(51) Int. Cl.
 *B60R 9/058* (2006.01)
 *F16B 2/12* (2006.01)
(58) Field of Classification Search
 USPC .......................................... 224/319, 315, 309
 See application file for complete search history.

(56) References Cited

U.S. PATENT DOCUMENTS

| | | | | |
|---|---|---|---|---|
| 5,030,052 A * | 7/1991 | Anderson | ................ | F16B 35/00 411/383 |
| 5,758,810 A * | 6/1998 | Stapleton | ................ | B60R 9/045 224/321 |
| 5,769,292 A * | 6/1998 | Cucheran | ................ | B60R 9/045 224/319 |
| 5,806,735 A * | 9/1998 | Christiansson | ......... | B60R 9/045 224/319 |
| 5,845,828 A * | 12/1998 | Settelmayer | ............ | B60R 9/045 224/321 |
| 6,622,898 B1 * | 9/2003 | Wang | ...................... | B60R 9/045 224/321 |
| 8,444,033 B2 * | 5/2013 | Brochier | ................. | B60R 9/048 224/319 |
| 8,556,146 B2 * | 10/2013 | Sautter | .................... | B60R 9/048 224/564 |
| 9,206,941 B2 * | 12/2015 | Smith | .................... | F16M 11/04 |
| 9,222,278 B2 * | 12/2015 | Park | ........................ | B60P 3/341 |
| 2005/0087220 A1 * | 4/2005 | Christensen | ............ | E04H 15/06 135/88.16 |
| 2008/0308138 A1 * | 12/2008 | Brochier | .................. | B60P 3/39 135/88.17 |
| 2010/0263698 A1 * | 10/2010 | Chiu | ....................... | E04H 15/06 135/88.17 |
| 2011/0139841 A1 * | 6/2011 | Sautter | ..................... | B60R 9/10 224/324 |

FOREIGN PATENT DOCUMENTS

| | | |
|---|---|---|
| FR | 2836432 A1 | 2/2002 |
| WO | 94/21490 A1 | 9/1994 |
| WO | 2009/115699 A1 | 9/2009 |
| WO | 2011/102780 A1 | 8/2011 |

* cited by examiner

ATTACHMENT DEVICE, SUPPORTING ACCESSORY AND ROOF TENT INCLUDING SUCH A DEVICE

TECHNICAL FIELD OF THE INVENTION

The present invention relates to an attachment device, a supporting accessory and a roof tent including such a device. It applies, in particular, to the field of attaching roof boxes and accessories, such as a roof tent or basket rack, for example, to the roof of a vehicle comprising roof bars.

STATE OF THE ART

Various systems currently exist for attaching a supporting accessory, such as a roof box, an automobile roof tent or a basket rack, on the roof bars of vehicles.

To attach an accessory such as a roof box, there are rapid, anti-theft systems such as patent FR2836432, accessible only through the inside of the roof box. However, access requires the user to be able to reach the system, which is located on top of the vehicle and, moreover, inside the roof box, which is difficult in the case of high vehicles. In addition, the system takes up space inside the roof box, hindering loading and this system cannot be used in the case of a roof tent, where the floor must be completely flat for sleeping on. Lastly, the system is limited in terms of the width of the roof bars on which it is attached, which can currently pose problems with some very wide wing-type roof bars.

There are other systems, used in particular to attach transversal bars onto longitudinal bars, such as patent application EP0894672, but they are difficult to apply for use with roof boxes or basket racks on transversal bars since access, between the vehicle's roof and the roof box or basket rack, might be difficult. In addition, these systems do not have a sufficient range of use for clamping both thin and very wide bars. Lastly, these systems comprise a large number of parts, which has an impact on manufacturing costs.

Another system of this type is described in patent application WO 94/21490, which uses a wedge system for clamping in all positions. In this known device, a screw in the axis of the channel of the bar (or rail) tightens two identical jaws. The outer surface of the jaw is inclined at about 60° angle and comprises a hole for the hexagonal screw. A 60° wedge is tapped to hold the screw and acts as a nut for the system. A compression spring between the jaws allows the blocking system to be preloaded using a small amount of force, which allows the system to be moved by pressing on the wedge.

This system has some drawbacks, such as the wedge effect, which is a function of the clamping screw and the slope of the wedge, and there is a contradiction between the clamping force of the jaws and the blocking force of the wedges. Depending on the slope of the wedge, one of the two forces will increase and the other decrease, although both are equally significant. In addition, if the screw breaks, there is no more attachment function, which may jeopardize the security of the load. Finally, the screw is guided by the threading, which moves radially under the wedge effect, and it is already guided by its head, which is in the hole of the other jaw, consequently there is double guidance, exposing the screw to additional mechanical stresses that must be avoided as there is a risk of the screw breaking.

There are also conventional systems with attachment by flanges, of various shapes, which are not easy to use since the screws or the nuts must be screwed at the location where the load rests on the bar, generally between the vehicle's roof and the load, locations that are not very accessible and have little room for the manipulations required. In addition, as the height of the bars relative to the roof varies greatly from one vehicle to another, it is not uncommon for screws to be too close to, or even touch, the roof and make the system unusable. Finally, these are not anti-theft systems.

There is also patent application WO 2009/115699, which comprises two jaws, each comprising a guiding body inserted into a rail and a clamp. Each guiding body comprises a tapped nut into which is inserted a threaded rod comprising two threads threaded in opposite directions, the screwing of the rod clamping the jaws. Once the jaws are clamped, self-locking of the guiding bodies occurs. However, this device is cumbersome because of the room needed to attach the rail to the supporting accessory. In addition, the solution is costly because of the threaded rod using two opposite threads and of the tapped nut and finally, this device is fragile because of the stresses exerted on the parts. Lastly this device creates shocks on the attachment rivets that may be present on a rail.

SUBJECT OF THE INVENTION

The present invention aims to remedy all or part of these drawbacks.

To this end, according to a first aspect, the present invention relates to a device for attaching to bars including:
  a C-shaped rail with an overall rectangular section having a plane of symmetry;
  a screw defining a first axis parallel to the axis of the rail; and
  at least two jaws, each jaw including:
    a guiding body portion running in the rail with a certain play and including a through-opening and
    a clamp portion outside the rail;
wherein:
  the head of the screw is inserted into the through-opening of one jaw;
  another jaw includes a nut in the opening thereof, rotatably locked around the first axis;
  the clamps of each jaw are off-center relative to the plane of symmetry of the rail, each on one side of the plane, clamping the bar by shearing;
  the screwing of the screw into the nut translates the jaws towards one another in the rail of the guiding body, and the engagement of the clamps of each jaw with the bar rotates the guiding body, thus causing same to stick by self-locking on at least two adjacent sides of the rail.

Thanks to these provisions, the device moves easily to the necessary location, following the spacing of the roof bars, encloses the bars of all widths, self-aligns and self-locks on two sides of the bar by clamping it tightly without requiring great effort on the part of the user, remains locked if the shank breaks, is operated from the exterior (does not impede the interior of a roof box or the floor of a roof tent), has an anti-theft function, is easy to access, easy to loosen, and consists of just a few simple parts that are not very expensive to produce.

In addition, the parts utilized in the present invention mean that the assembly of the device can be made easier and the manufacturing costs of the device can be minimized. In effect, use a single-thread screw and a nut means that standardized, and therefore less expensive, elements can be used.

Also, the guiding body of each jaw is self-locked on two adjacent sides of the rail, which allows the device to be made more reliable in the event of a shock or bumps in the road.

In some embodiments, each clamp forms an acute angle with the first axis, and the clamps are inclined towards each other.

These embodiments make it possible to come into contact with the bar more quickly. In addition, thanks to these embodiments, the clamps completely enclose the bar and prevent the bar from coming free due to vehicle vibrations on the road, for example.

In some embodiments, each clamp has a shoulder for abutting the clamp against the bar after self-locking.

The advantage of these embodiments is to enable contact between the bar and the clamp even if the clamp is rotated slightly due to the self-locking of the guiding body in the rail. This self-locking, combined with the shouldering and the off-centering of the jaws, therefore allows each clamp to be clamped against the bar.

In some embodiments, the opening of each jaw is at least partially ovoid in shape, allowing the screw head or nut to rotate during self-locking.

Thanks to these provisions, when guiding bodies are self-locked the screw head and nut can stay on the first axis. In this way, they are not damaged by the self-locking. In addition, the shank of the screw is not subjected to forces due to twisting at the screw head and nut.

In some embodiments, a washer is placed on the screw near the screw head, the screw head and washer being fitted in the opening of a jaw.

These embodiments make it possible to ensure that the screw head is blocked in the through-opening in an inexpensive way. And the washer prevents the opening of the guiding body from being damaged by compression, i.e. the washer prevents the metal forming the guiding body being scoured.

In some embodiments, the guiding body of each jaw comprises a groove on a surface opposite the clamps.

The advantage of these embodiments is to facilitate the passage of the guiding body in respect of rivets located on the surface opposite the clamps.

In some embodiments, the screw is connected to a threaded rod by a sleeve comprising a thread lock to stick the sleeve to the screw and the threaded rod.

These embodiments make it possible to prevent a failure of the screw by favoring the failure of the thread lock in the sleeve should the device be blocked, if it is completely blocked. Unscrewing the screw breaks the thread lock and allows the device that is the subject of the present invention to be released.

In some embodiments, the opening including the screw head has a conical shape connecting the opening to an edge of the guiding body.

Thanks to these provisions, the tool used inserted into the screw head, for clamping the guiding body, is automatically guided to the corresponding relief in the screw head, which makes clamping or unclamping easier for the user.

In some embodiments, the head of the screw has an asymmetric shape.

These embodiments allow a key to be created that is difficult to reproduce so that the device is not removed by anyone, in particular by ill-intentioned people.

According to a second aspect, the present invention relates to a supporting accessory for a vehicle including roof bars comprising at least one device that is the subject of the present invention.

According to a third aspect, the present invention relates to a roof tent for a vehicle including roof bars, the tent comprising at least one device that is the subject of the present invention.

As the particular aims, advantages and features of the supporting accessory and the roof tent that are the subjects of the present invention are similar to those of the device that is the subject of the present invention, they are not repeated here.

BRIEF DESCRIPTION OF THE FIGURES

Other advantages, aims and particular features of the invention will become apparent from the non-limiting description that follows of at least one particular embodiment of the device, supporting accessory and roof tent that are the subjects of the present invention, with reference to drawings included in an appendix, wherein.

DESCRIPTION OF EXAMPLES OF REALIZATION OF THE INVENTION

Figure 1:
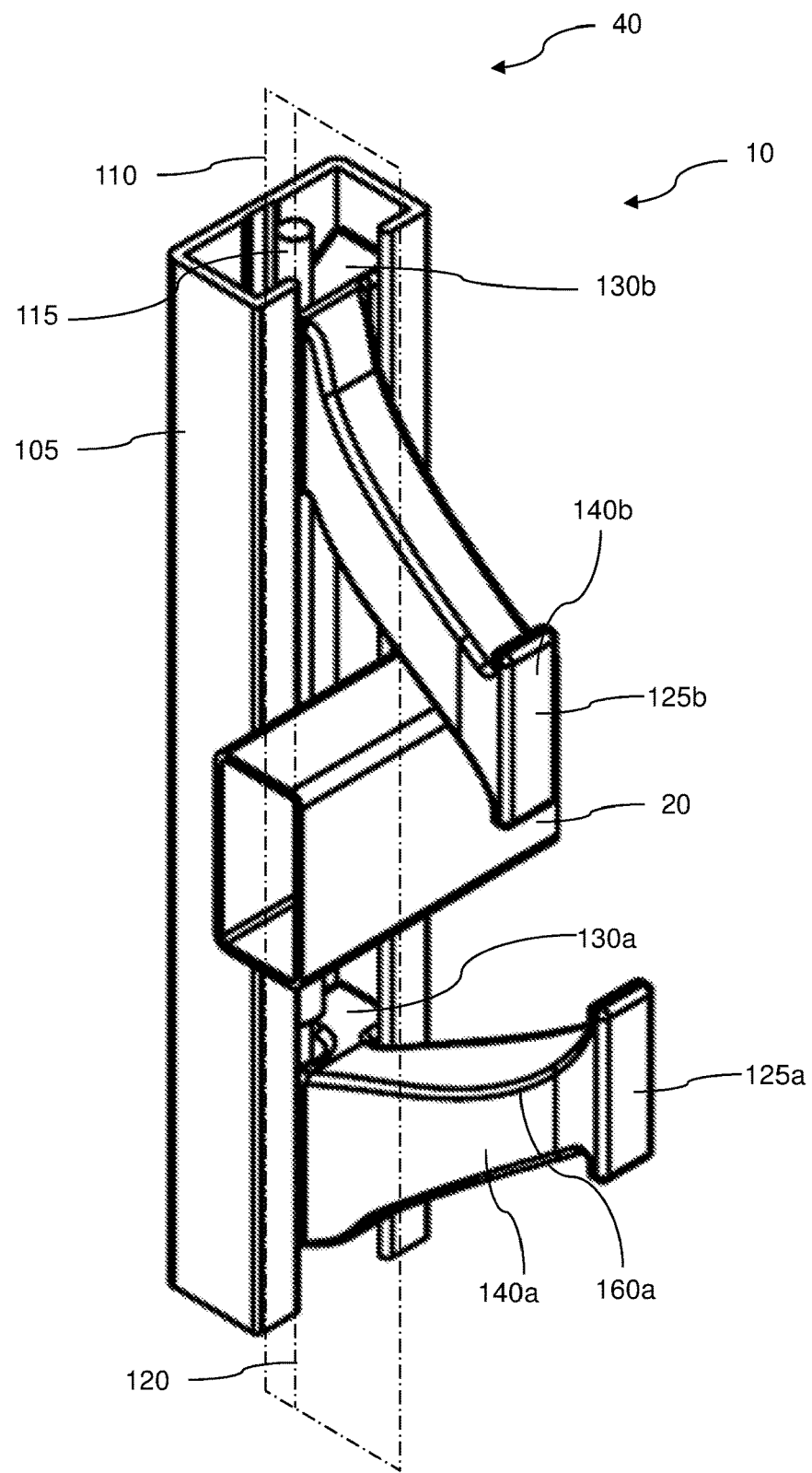
FIG. 1 represents, schematically and in perspective, a first particular embodiment of the device that is the subject of the present invention.
Figure 2:
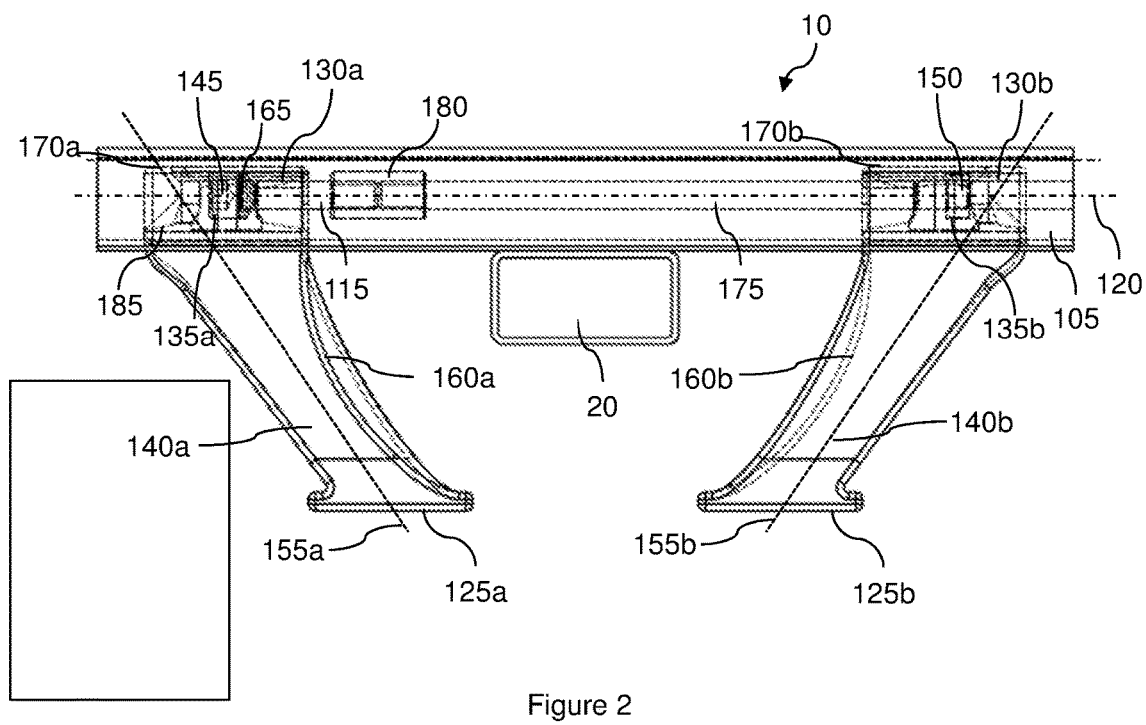
FIG. 2 represents, schematically and in a side view, a particular embodiment of the device that is the subject of the present invention, not fixed on a roof bar.
Figure 3:
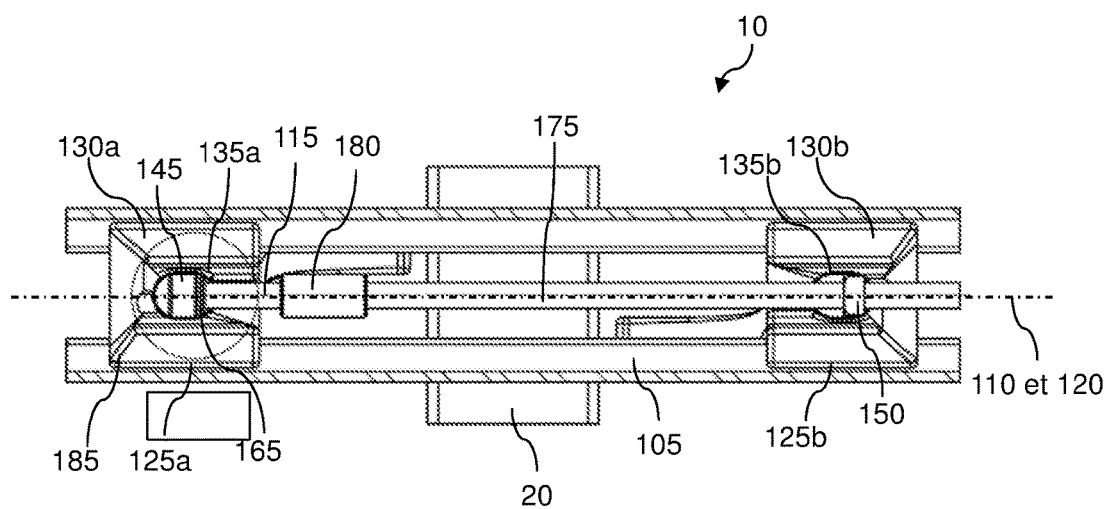
FIG. 3 represents, schematically and in a front view, the first particular embodiment of the device that is the subject of the present invention, not fixed on a roof bar.
Figure 4:
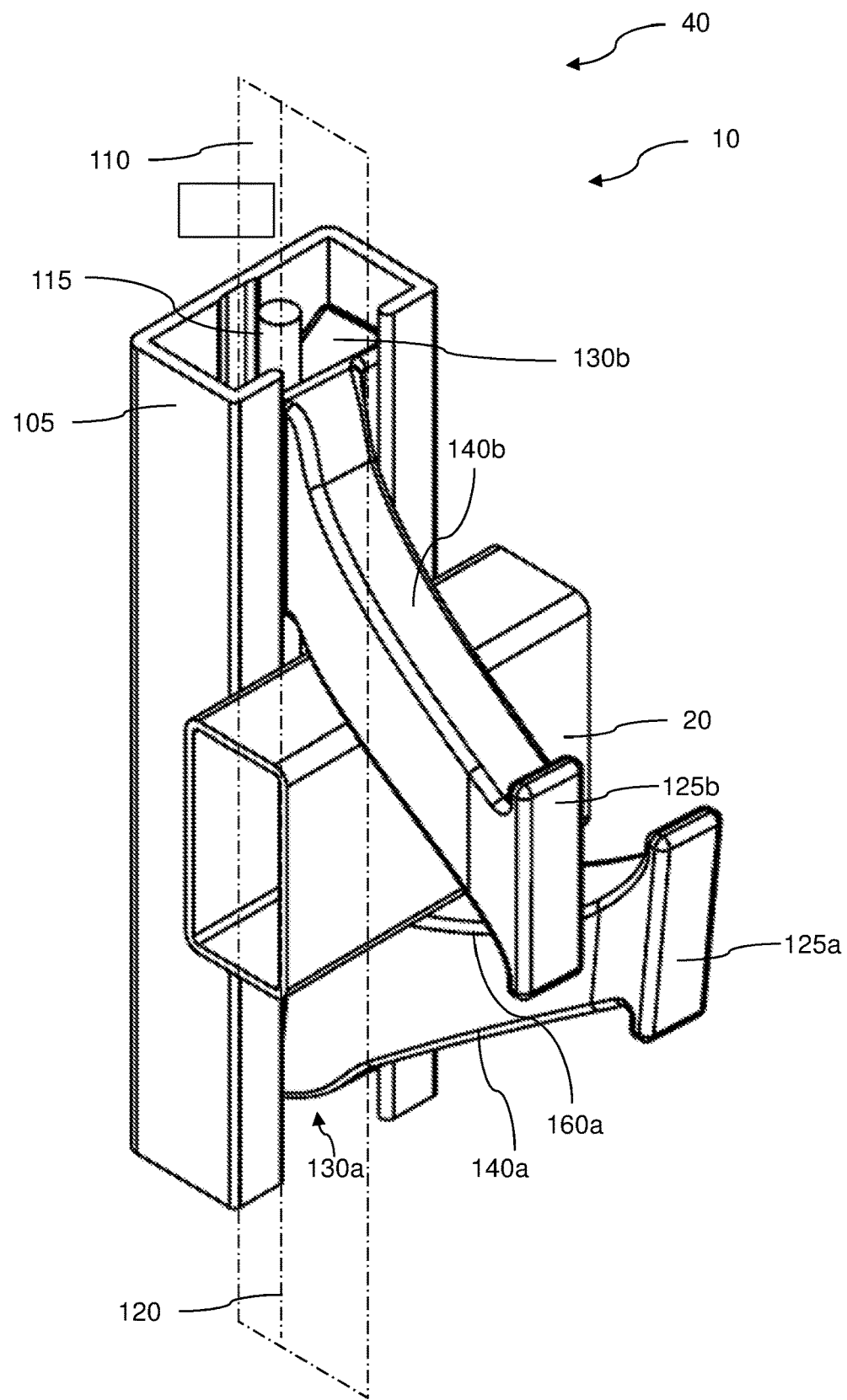
FIG. 4 represents, schematically and in perspective, the first particular embodiment of the device that is the subject of the present invention, fixed on a roof bar.
Figure 5:
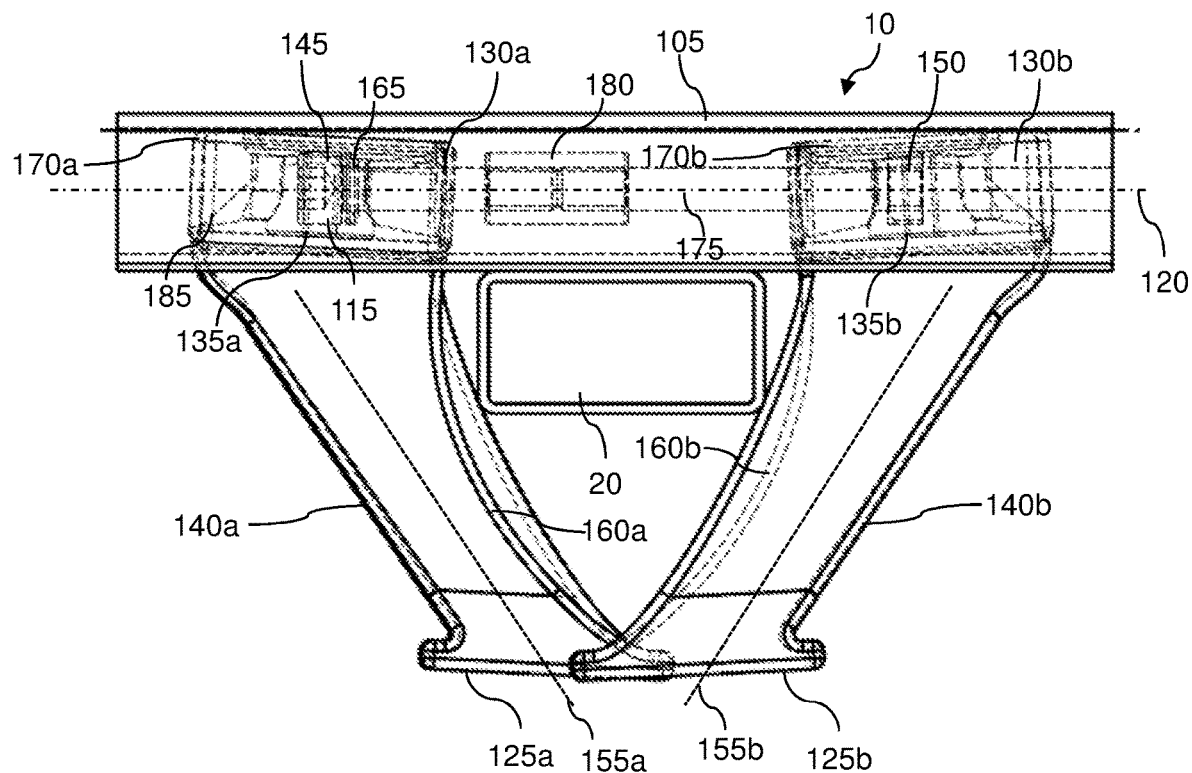
FIG. 5 represents, schematically and in a side view, the first particular embodiment of the device that is the subject of the present invention, fixed on a roof bar.
Figure 6:
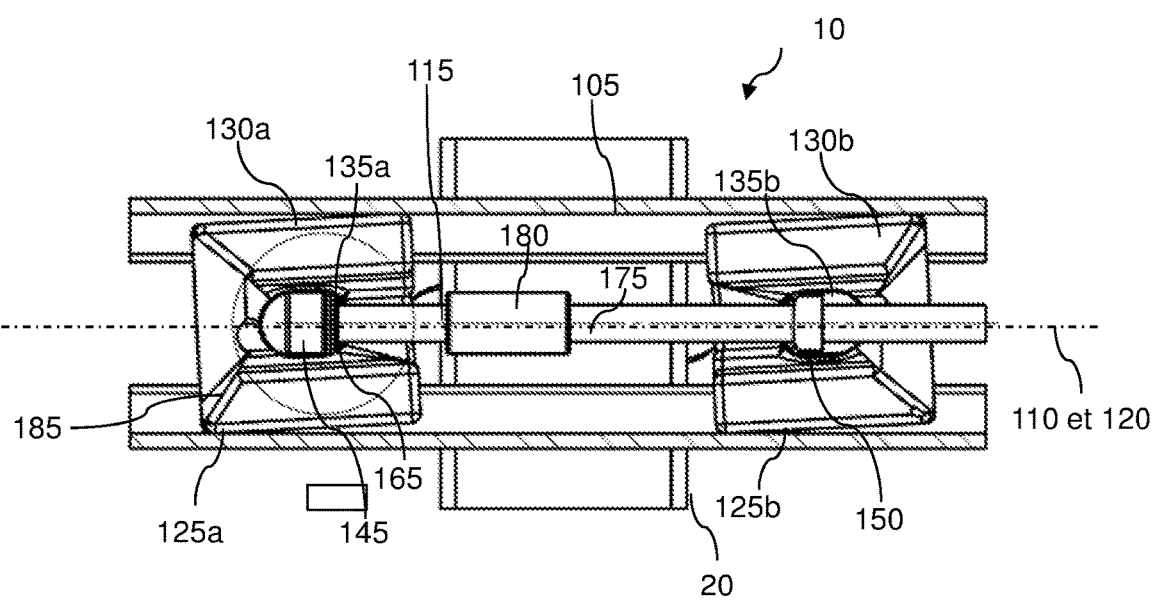
FIG. 6 represents, schematically and in a front view, the first particular embodiment of the device that is the subject of the present invention, fixed on a roof bar.

The present description is given in a non-limiting way, each characteristic of an embodiment being able to be combined with any other characteristic of any other embodiment in an advantageous way. In addition, each parameter of an example of realization can be utilized independently from the other parameters of said example of realization.

It is now noted that the figures are not to scale.

FIGS. 1 to 6, which are not to scale, show a schematic view of an embodiment of the device 10 that is the subject of the present invention.

The device 10 for attachment on roof bars 20 comprises a C-shaped rail 105 with an overall rectangular section having a plane of symmetry 110. The rail 105 has an overall rectangular cross-section and is open on one of the long sides of the rectangle. The plane of symmetry 110 is parallel to the short sides of the rectangle and passes through the middle of the large sides of the rectangle defining the cross-section of the rail 105. The opening is configured to match a thickness of each clamp.

The rail 105 is longitudinal with a length greater than the spacing between several roof bars 20 of a vehicle 40, for example. The cross-section of the rail 105 is invariable over the length of the rail 105. The rectangle has a constant thickness over the entire C-shape. The corners of the rectangle can be rounded. The rail 105 therefore has a hollow interior.

The rail 105 defines an axis along the length of the rail 105. The axis defined in this way passes through all centers of gravity of the C-shaped overall rectangular transverse cross-section of the rail 105.

In some embodiments, the rail 105 can comprise a groove, on the side of the rectangle opposite the opening. The groove corresponds to a location for rivets for attaching a supporting accessory, such as a roof tent, roof box or basket rack, for example, to the rail 105. The rivets placed in the groove are therefore not damaged when a jaw is moved.

The rail can be made of stainless steel or aluminum.

The device 10 comprises a screw 115 defining a first axis 120 parallel to the axis of the rail 105. The axis 120 is preferably included within the plane of symmetry 110 of the rail 105 such that jaws moving in the rail are substantially at an equal distance from each short side of the rail 105.

The screw 115 is a cylindrical socket head screw. Preferably, the shape of the recess of the screw head 145 is asymmetric. It is recalled here that the recess of a screw head 145 is the shape of the cavity making it possible to rotate the screw in the case of a socket head screw. For example, the recess of a hexagonal socket head screw (known as a CHC screw) is a hexagon. These embodiments make it possible to guarantee a user that the attachment device cannot be removed by an ill-intentioned person having ordinary tools. In these embodiments, the head of the screw has an asymmetric shape and can only be actuated by a tool of corresponding shape.

A nut 150 is placed at the extremity of the screw. The nut 150 is a square nut, for example.

In some embodiments, the screw 115 is connected to a threaded rod 175 by a sleeve 180 comprising a thread lock to stick the sleeve 180 to the screw 115 and the threaded rod 175. The threaded rod 175 has the same diameter as the shank of the screw 115 and as the nominal diameter of the sleeve 180. In these embodiments, the nut 150 is placed on the threaded rod 175.

The device 10 also comprises at least two jaws, 125*a* and 125*b*, each jaw, 125*a* and 125*b*, including:
 a guiding body portion, 130*a* or 130*b*, running in the rail 105 with a certain play and including a through-opening, 135*a* or 135*b*, and
 a clamp portion, 140*a* or 140*b*, outside the rail 105.

In the description that follows, the jaws, 125*a* and 125*b*, will be described without differentiation since the jaws, 125*a* and 125*b*, are identical. Nevertheless, the arrangement of each jaw, 125*a* and 125*b*, relative to the device is different. Therefore, the letters "a" and "b" for all the elements of the jaws are omitted except when a difference emerges between the arrangements of the jaws, 125*a* and 125*b*.

The guiding body 130 of a jaw 125 is overall parallelepipedal, and the dimensions of the parallelepiped match the dimensions of the inside of the rail with a certain play. The guiding body 130 has one surface opposite the opening of the cross-section of the rail 105 on which the clamp 140 is attached. The clamp 140 traverses the opening of the rail 105.

The through-opening 135 of the jaw 125 traverses the guiding body 130 in the axis of the rail 105 and is open on the surface of the guiding body 130 opposite the surface comprising the clamp 140. When the rail 105 comprises rivets, these attachment rivets of the rail 105 correspond to the opening of the guiding body 130 open on the surface opposite the surface comprising the clamp 140. In this way, even if there is no groove in the rail 105, the rivets do not hinder the guiding body 130 from circulating. The screw head 145 or nut 150 is inserted into the through-opening by the open surface of the guiding body 130 opposite the surface comprising the clamp 140. Once in the rail 105, the screw head 145 or nut 150 can no longer come out.

The through-opening has dimensions such that the shank of the screw 110 can traverse the opening 135, but the screw head 145 is blocked by the dimensions of the opening 135.

Preferably, the opening 135 of the jaw 125 is at least partially ovoid in shape, allowing the screw head 145 or nut 150 to rotate during self-locking. The opening 135 therefore has an ovoid shape open along the axis 120 of the screw 115 towards each surface of the guiding body 130 in the axis of the rail 105 to let the shank of the screw 115 pass. The ovoid shape is such that the opening is O-shaped around the screw head 145 or nut 150 to leave a certain play around the screw head 145 or nut 150. The play makes it possible to preserve the screw head 145 and nut 150 when the guiding body 130 is self-locked.

The head of the screw 145 is inserted into the through-opening 135*a* of one jaw 125*a*. The other jaw 125*b* includes a nut 150 in its through-opening 135*b*, rotatably locked around the first axis 120.

In some preferred embodiments, a washer 165 is placed on the screw 115 near the screw head 145, the screw head 145 and washer 165 being fitted in the opening 135*a* of a jaw 125*a*. The screw head 145 and washer 165 are fitted into the ovoid portion of the opening 135*a* by the surface of the guiding body 130*a* opposite the surface comprising the junction with the clamp 140*a*.

Preferably, once the screw head 145 is fitted into the guiding body 130*a*, the nut 150 is placed on the shank of the screw 115 or the threaded rod 175 and is fitted into the guiding body 130*b*. The nut 150 is fitted into the ovoid portion of the opening 135*b* by the surface of the guiding body 130*b* opposite the surface comprising the junction with the clamp 140*b*.

The jaws 125*a* and 125*b* are therefore connected by the screw 115, and, in some embodiments, the threaded rod 175. The screwing of the screw 115 leads to the jaws, 125*a* and 125*b*, being clamped to each other.

The jaw assembly thus formed is placed in the rail 105, only the clamps, 140*a* and 140*b*, extending beyond the rail 105.

The screwing of the screw 115 in the nut 150 translates the jaws, 125*a* and 125*b*, towards each other in the rail 105 of the guiding body, 130*a* and 130*b*, and the engagement of the clamps, 140*a* and 140*b*, of each jaw, 125*a* and 125*b*, with the bar 20 rotates the guiding body, 130*a* and 130*b*, thus causing the guiding body, 130*a* and 130*b*, to stick by self-locking on at least two adjacent sides of the rail 105.

In some embodiments, the guiding body 130 of each jaw 125 comprises a groove 170 on a surface opposite the clamps 140. The groove 170 is in the axis of the rail 105 once the jaw 125 is inserted into the rail. The groove corresponds to a location for rivets on the rail 105 for attaching a supporting accessory, such as a roof tent, roof box or basket rack, for example. The rivets placed facing the groove are therefore not damaged when the jaw is moved 125.

Preferably, the opening 135*a* including the screw head 145 has a conical shape connecting the opening 135*a* to an edge of the guiding body 130*a*. The conical shape connects the opening 135*a* to the edge of the guiding body 130*a* perpendicular to the axis of the rail 105 that is not traversed by the shank of the screw 115. These embodiments make it possible to guide the tool for screwing the screw 115 directly towards the screw head 145.

The clamp 140 has a substantially parallelepiped cross-section at the junction with the guiding body 130. The dimension in the axis of the rail 105 is equal to that of the guiding body 130. The dimension in the axis perpendicular to the rail 105 in the surface of the rail 105 comprising the opening is smaller than the dimension of the opening. The clamp 140 is preferably positioned in contact with one of the surfaces of the opening of the rail 105.

The clamp 140 is off-center relative to the plane of symmetry 110 of the rail 105. Therefore, when clamp 140a is placed facing clamp 140b, the clamps, 140a and 140b, are off-center relative to the plane of symmetry 110 of the rail 105, each on one side of the plane 110, clamping the bar 20 by shearing.

The cross-section of the clamp 140 is substantially parallelepipedal from the guiding body 130 to the extremity of the clamp 140. The length of the clamp from the guiding body 130 to the extremity of the clamp 140 is configured to be greater than the dimensions of the bar 20.

The clamp 140 can taper at its extremity to create stop for blocking the bar 20 against the clamp 140 in the event of shocks.

In some preferred embodiments, each clamp 140 forms an acute angle with the first axis 120, and the clamps, 140a and 140b, are inclined towards each other.

The clamp 140 inclined along an axis 155 forms an acute angle with the axis 120 by projection in the plane of symmetry of the rail 105. The inclination of the clamps, 140a and 140b, towards each other makes it possible to enclose the bar to prevent it coming free in the event of vibrations.

In some embodiments, the clamp 140 has a shoulder 160 for abutting the clamp 140 against the bar 20 after self-locking.

The shoulder 160 has a substantially circular arc shape from the bottom of the clamp 140 in contact with the guiding body 130 to the extremity of clamp 140. The shoulder 160 allows savings of material and the clamp 140 to maintain constant contact with the bar 20 after self-locking of the jaw 125. The shoulder is located on the surface of the clamp 140 distant from the opening of the rail 105.

In some embodiments, the clamps 140 of the jaws 125 are covered by an elastic material whose compression makes it possible to provide a constant force on the guiding bodies 130 and thus to maintain the self-locking, in the event of strong vibrations, for example.

To make it easier to manufacture the device 10, the jaws, 125a and 125b, are identical, only their position in the device, with regard to the elements of the device 10 described above, differentiates the jaws, 125a and 125b.

Preferably, the jaws 125 are made of aluminum. The coefficient of friction between the rail 105 and the guiding body, 130a and 130b, is greater than or equal to 0.25, which corresponds to the dry rough metal surfaces of the parts.

The guiding body 130 of each jaw 125 has play relative to the dimensions of the cross-section of the rail 105 along this cross-section in order to be able to achieve self-locking.

The rail 105 has an opening on a longitudinal extremity of the rail 105 makes it possible to remove or insert one or more jaw assemblies in the device 10. The jaw assemblies are easily interchangeable without tools, by making the assembly slide manually to the opening at the longitudinal extremity of the rail 105.

Figure 7:
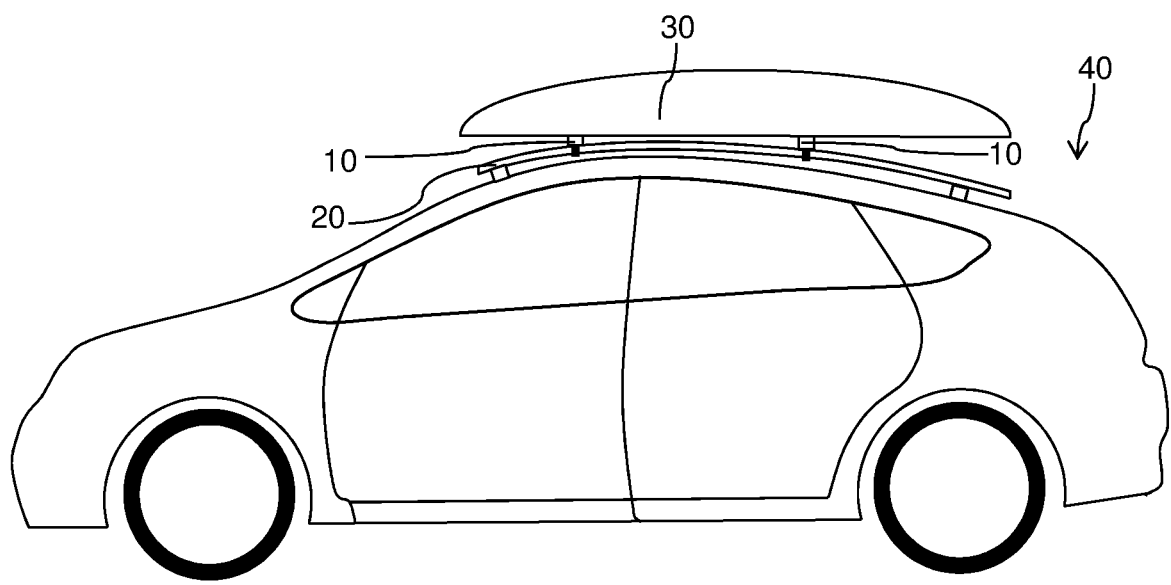
FIG. 7 represents, schematically and in a side view, a first particular embodiment of roof tent comprising a device that is the subject of the present invention, the roof tent being assembled on a vehicle.

FIG. 7 shows a vehicle 40 comprising roof bars 20 on which are mounted a supporting accessory, such as a roof box, roof tent 30, bicycle rack or basket rack. The vehicle 40 has two roof bars in the direction of movement of the vehicle 40.

The roof tent 30 is attached by rivets to two rails 105. The rails 105 are mounted perpendicular to the roof bars 20. Each rail 105 comprises two jaw assemblies of the device 10 that is the subject of the present invention.

The term 'jaw assembly' refers to the assembly of elements of the device 10 except for the rail 105.

The jaw assemblies of each rail 105 are tightened and self-locked on a bar 20. The roof tent 30 is therefore held firmly in position by four jaw assemblies.

The device 10 is utilized to quickly, simply and securely attach supporting accessories for a motor vehicle, such as such as a roof tent, roof box, bicycle rack or basket rack, on the roof bars of vehicles.

The device 10 is positioned such that the jaws, 125a and 125b, are positioned either side of the bar 20, the rail 105 resting on the bar 20.

The tool corresponding to the screw head 145 is inserted into the guiding body 130a of the jaw 125a, and is guided by the conical portion of the opening 135a towards the screw head 145. Once the nesting between the tool and the screw 115 is achieved, the user can turn the screw 115.

Rotating the screw 115 leads to the jaws, 125a and 125b, being brought together until the clamps, 140a and 140b, abut against the bar 20. By continuing the screwing, the guiding body, 130a and 130b, is turned and blocked by self-locking against all the surfaces of the cross-section of the rail 105. The self-locking of the guiding bodies, 130a and 130b, in the rail 105 allows the jaws, 125a and 125b, to remain blocked if there is breakage of the screw 115, threaded rod 175 and/or of the thread lock between the sleeve 180, the screw 115 and the threaded rod 175 thus ensuring that the stowing of the load on the roof bars 20 is secure.

This coupling of all the degrees of liberty makes it possible to transmit forces compatible with the envisaged use in all directions and torques in all directions.

To unlock the device 10, the user unscrews the screw 115 and releases the guiding body 130 of the self-locking. The guiding bodies 130 move apart from each other until the distance between the clamps 140 is large enough to let the bar 20 pass.

The invention claimed is:

1. A device for attachment on roof bars including:
a C-shaped rail with an overall rectangular section having a short side and long side and defining a plane of symmetry being parallel to the short side and passing through the middle of the long side;
a screw defining a first axis parallel to the plane of symmetry; and
at least two jaws, each jaw including:
a guiding body portion, running in the rail with a certain play and including a through-opening, and
a clamp portion extending outside the rail;
the device being characterized in that:
the head of the screw is inserted into the through-opening of one jaw;
another jaw includes a nut in its through-opening, rotatably locked around the first axis;
the clamps of each jaw are off-center relative to the plane of symmetry of the rail, such that one of the two jaws is disposed on one side of the plane of symmetry and the other one of the two jaws is disposed on the opposite side of the plane of symmetry, clamping thereby the bar by shearing;

the screwing of the screw into the nut translates the jaws towards one another in the rail of the guiding body, and the engagement of the clamps of each jaw with the bar rotates the guiding body, thus causing same to stick by self-locking on at least two adjacent sides of the rail.

2. The device according to claim 1 wherein each clamp forms an acute angle with the first axis, and the clamps are inclined towards each other.

3. The device according to claim 1, wherein each clamp has a shoulder for abutting the clamp against the bar after self-locking.

4. The device according to claim 1, wherein the opening of each jaw is ovoid in shape along the first axis of the screw, allowing the screw head or nut to rotate during self-locking.

5. The device according to claim 1, wherein a washer is placed on the screw near the screw head, the screw head and washer being fitted in the opening of a jaw.

6. The device according to claim 1, wherein the guiding body of each jaw comprises a groove on a surface opposite the clamps.

7. The device according to claim 1, wherein the screw is connected to a threaded rod by a sleeve comprising a thread lock to stick the sleeve to the screw and the threaded rod.

8. The device according to claim 1, wherein the opening including the screw head has a conical shape connecting the opening to an edge of the guiding body.

9. The device according to claim 1, wherein the screw head has an asymmetric shape.

10. A supporting accessory for a vehicle including roof bars comprising at least one device according to claim 1.

11. A roof tent for a vehicle including roof bars, the tent comprising at least one device according to claim 1.

* * * * *